Patented Feb. 29, 1944

2,343,095

UNITED STATES PATENT OFFICE 2,343,095

RESIN DISPERSION USEFUL IN THE TEXTILE AND PAPER INDUSTRIES

Joseph Edward Smith, Wilmington, Del., assignor to E. I. du Pont de Nemours & Company, Wilmington, Del., a corporation of Delaware No Drawing. Application August 3, 1940,
Serial No. 351,089

6 Claims. (Cl. 8—143)

This invention relates to resin dispersions substantive to animal fibers, nylon and cellulosic fibers and more particularly to resin dispersions of methacrylic acid esters or vinyl alcohol esters substantive to animal fibers, nylon and cellulosic fibers, the dispersions being prepared using a cationic surface active agent as emulsifying agent. This invention relates further to dispersions of mixed resins prepared by dissolving resinous materials in monomeric liquids capable of polymerization, emulsifying and polymerizing, the dispersions being prepared using a cationic surface active material as emulsifying agent.

This invention has as an object the preparation of resin dispersions substantive to animal fibers, nylon and cellulosic fibers. A further object is the preparation of resin dispersions of methacrylic acid esters and vinyl alcohol esters substantive to animal fibers, nylon and cellulosic fibers. A still further object of the invention is the preparation of dispersions of mixed resins substantive to animal fibers, nylon and cellulosic fibers. Other objects will appear hereinafter.

These objects are accomplished by the following invention. An aqueous solution of a cationic surface active agent is agitated vigorously with one or more liquid polymerizable conjugated compounds containing a small amount of benzoyl peroxide. In the preparation of dispersions of mixed resins the solution of cationic surface active agent is agitated vigorously with a solution of a resinous material dissolved in one or more liquid conjugated compounds containing a small amount of benzoyl peroxide. During agitation the salt of a polyvalent metal preferably aluminum acetate, aluminum formate or barium chloride, and a volatile organic acid preferably acetic acid or formic acid may be added. After emulsification, the emulsion is heated to produce polymerization of the conjugated compound and so obtain a stable dispersion of the resin. The resin dispersion is substantive to animal fibers, nylon and cellulosic fibers.

It frequently is highly desirable to apply resin dispersions by a process of exhaustion from a dilute bath. In order to carry out such an application the resin dispersion must have such an affinity for the fiber that the dispersed particles migrate from the bath to the textile and deposit uniformly on the surface of the textile.

The preparation of stable resin dispersions by the process of emulsion polymerization requires a careful selection of the emulsifying agent particularly in the preparation of substantive dispersions for all types of textile fibers and paper.

It has been found in this invention that cationic surface active agents are particularly valuable for preparing stable aqueous resin dispersions by the process of emulsion polymerization, and these resin dispersions are substantive to animal fibers, nylon and cellulosic fibers. The preferred surface active agents for use has an aliphatic chain of 12 to 18 carbon atoms in the cation. Typical cationic surface active agents which are useful are long-chain alkyl pyridinium halides, e. g., cetyl pyridinium bromide; long chain alkyl ammonium halides, e. g., stearyl trimethyl ammonium bromide; products of the type of diethanolamine condensed with stearic acid and reacted with dimethyl sulfate (U. S. Patent 2,096,749); long chain alkyl phosphonium halides; long-chain alkyl sulfonium compounds; and amides prepared by reacting long chain acids or acid derivatives with polyamines, followed by alkylation, e. g., the product prepared by treating the amide of oleic acid and ethylene diamine with dimethyl sulfate. The substantivity for textile fibers and paper of the resin dispersions prepared with these surface active agents is increased by the addition to the dispersion of water soluble multivalent metal salts, particularly aluminum and barium salts and an acid, preferably a volatile organic acid. The addition of the metal salts and acids may be made either before or after polymerization.

The resin prepared in this invention may be the product of polymerization, interpolymerization, or copolymerization of one or more polymerizable, water insoluble, liquids. Suitable monomeric compounds for use are vinylesters, vinyl halides, vinyl esters, styrene, acrylic acid, and methacrylic acid esters, acrylonitriles, methacrylonitriles, acrylamides and methacrylamides. Resinous materials soluble in the monomeric liquid may be dissolved therein prior to polymerization to obtain mixed resins. Examples of suitable resins are coumarone-indene resins, alkyd and modified alkyd resins, phenol-aldehyde and modified phenol-aldehyde resins, natural resins and their esters. Plasticizers may be incorporated in the resin phase without a detrimental effect on the substantivity of the dispersed resin for textile fibers and paper.

The substantive resin dispersions are applied to textiles and paper in the conventional equipment available in the trade. Applications to hoisery are carried out in the rotary type or paddle wheel dyeing machine. Applications to knit fabrics may be carried out in a reel machine. Applications to wool may be carried out in a reel machine or a dolly washer. Applications to paper are carried out in a beater. The pH of the bath during application of the resin dispersions is preferably in the range 4.0 to 7.5; the dispersions have marked substantivity for textile fibers outside this pH range but may be less stable under more alkaline conditions.

In carrying out the invention, an aqueous solution of a cationic surface active agent is agitated vigorously with one or more liquid conjugated polymerizable compounds in the presence of an oxidation catalyst such as benzoyl peroxide or hydrogen peroxide. The liquid polymerizable compounds may also contain resins and plasticizers in solution. An aluminum or barium salt together with an acid may be added while continuing the agitation. The emulsion obtained may be homogenized. The emulsion is heated, preferably to a temperature above 60° C. to induce polymerization of the emulsified monomer. Stable dispersions are produced which are substantive to cellulosic fibers as well as animal fibers and nylon.

As an alternative method for carrying out the invention, the aluminum or barium salt and the acid may be added to the dispersion after the polymerization process.

The benzoyl peroxide used as an oxidation catalyst is representative of catalysts soluble in organic solvents. Water soluble oxidation catalysts such as hydrogen peroxide may be used instead; they are dissolved in the aqueous phase for use.

The following examples are illustrative of the invention but are not intended as limiting it in any way. The amounts of materials used are expressed as parts by weight except where it may be otherwise indicated.

*Example 1*

Twenty-five parts of methyl methacrylate monomer containing 0.25 part of benzoyl peroxide were mixed with vigorous agitation with 0.5 part of stearyl trimethyl ammonium bromide dissolved in 74.25 parts of water. The emulsion was heated to 67° C. in a closed container, and the temperature held there for 20 hours. A stable dispersion of a resin was obtained.

*Example 2*

(a) 0.5 gram of the resin dispersion from Example 1 were dispersed in 200 cc. of water contained in a pint Mason jar. A 10 gram piece of wool serge was placed in the jar and agitated for 20 minutes at 100° F. About 70% of the dispersed phase was absorbed by the wool as judged by turbidity tests. The wool serge was dried on a mangle heated to about 260° F. A full hand was imparted to the fabric.

(b) 0.5 gram of the product from Example 1 were applied to a 10 gram silk stocking as in (a). About 80% of the dispersed phase was absorbed by the stocking. The stocking was dried on a form heated to about 220° F. The stocking was excellently delustered.

(c) 0.5 gram of the product from Example 1 were applied to a 10 gram nylon stocking as in (a) but using a temperature of 120° F. The stocking was dried on a form heated to about 220° F. The stocking was excellently delustered.

(d) 0.5 gram of the product from Example 1 were applied to a 10 gram strip of viscose process rayon piece goods by the method of (a). About 75% of the dispersed phase was absorbed by the goods as judged by a turbidity test. The goods were dried at about 240° F. The goods had a full hand and were well delustered.

(e) 0.5 gram of the product from Example 1 were applied to a 10 gram strip of cellulose acetate rayon piece goods by the method of (a). About 75% of the dispersion was absorbed as judged by a turbidity test. The goods were dried under cloth with a hot iron. A full hand was imparted to the goods. The goods were excellently delustered.

*Example 3*

Cetyl pyridinium bromide was substituted for the stearyl trimethyl ammonium bromide in Example 1 to obtain similar results.

*Example 4*

The condenssation product of diethanolamine and stearic acid reacted with dimethyl sulfate (U. S. Patent 2,096,749) was substituted for the stearyl trimethyl ammonium bromide in Example 1. An excellent, stable emulsion was obtained.

*Example 5*

The reaction product of trimethylamine and alpha brom stearic acid (U. S. Patent 2,129,264, Example 1) was substituted for the stearyl trimethyl ammonium bromide in Example 1. Similar results were obtained.

*Example 6*

The monomer of n-butyl methacrylate was substituted for the monomer of methyl methacrylate in Example 4; a stable emulsion was obtained. The emulsion was applied to wool, silk, nylon, viscose process rayon, and cellulose acetate rayon as in Example 2. The degree of exhaustion obtained was similar to that in Example 2. The product produced a full, crisp finish on the fabrics and hosiery.

*Example 7*

Twenty-five parts of n-butyl methacrylate monomer containing 0.25 part of benzoyl peroxide were mixed with vigorous agitation with 0.5 part of the condensation product of diethanolamine and stearic acid reacted with dimethyl sulfate dissolved in 61.95 parts of water. During agitation 1.6 parts of basic aluminum acetate and 0.7 part of acetic acid dissolved in 10 parts of water were added. The emulsion was heated to 67° C., and the temperature held there for 20 hours. A stable dispersion of a resin was obtained.

*Example 8*

(a) 0.5 gram of the resin dispersion from Example 7 was dispersed in 200 cc. of water contained in a pint Mason jar. A 10 gram piece of wool serge was entered in the jar and agitated for 20 minutes at 100° F. About 90% of the dispersed phase was absorbed by the wool as judged by turbidity tests. The wool serge was dried on a mangle heated to about 260° F. A full, stiff hand was imparted to the fabric.

(b) 0.5 gram of the product from Example 7 was applied to a 10 gram silk stocking as in (a). About 95% of the dispersed phase was absorbed by the stocking as judged by turbidity tests. The stocking was dried on a form heated to 220° F. A full, crisp hand was obtained on the stocking.

(c) 0.5 gram of the product from Example 7 was applied to a 10 gram nylon stocking as in (a) but using a temperature of 120° F. The stocking was dried on a form heated to about 220° F. A full, crisp hand was obtained on the stocking.

(d) 0.5 gram of the product from Example 7 was applied to a 10 gram strip of viscose process rayon piece goods as in (a). About 90% of the dispersed phase was absorbed by the goods. The goods were dried at about 260° F. A full, crisp hand was obtained on the fabric.

(e) 0.5 gram of the product from Example 7 was applied to a 10 gram strip of cellulose acetate rayon as in (a). About 90% of the dispersed phase was absorbed as judged by turbidity tests. The cellulose acetate rayon was hydroextracted and dried at about 220° F. A full, crisp hand was obtained on the goods.

Example 9

Barium chloride was substituted for the aluminum acetate in Example 7. Similar results were obtained.

Example 10

Methyl methacrylate monomer was substituted for n-butyl methacrylate monomer in Example 7. A stable emulsion was obtained. The emulsion was applied to wool, silk, nylon, viscose process rayon and cellulose acetate rayon as in Example 8. A full hand was obtained on the fabrics. The silk, nylon, cellulose acetate and viscose process rayon were excellently delustered.

Example 11

Twenty-five parts of vinyl acetate monomer were mixed with vigorous agitation with 1 part of the condensation product of diethanol amine and stearic acid reacted with dimethyl sulfate (U. S. Patent 2,096,749) and 1.25 parts of 3% hydrogen peroxide in 72.75 parts of water. The emulsion was heated to 65° C., and the temperature held there for 16 hours. An excellent stable dispersion of a resin was obtained. The product was applied to wool, silk, nylon, viscose process rayon, and cellulose acetate rayon as in Example 2. A full crisp hand was obtained on the fabrics.

Example 12

94.5 parts of the product of Example 11 were mixed with 5 parts of a 32% basic aluminum acetate solution and 0.5 part of acetic acid. An excellent, stable emulsion was obtained. The product was applied to wool, silk, nylon, viscose process rayon and cellulose acetate rayon as in Example 2. The product of Example 12 exhausted better on the fabrics than the product of Example 11. A full crisp hand was obtained on the fabrics.

Example 13

Stearyl trimethyl ammonium bromide was substituted for the condensation product of diethanolamine and stearic acid reacted with dimethyl sulfate used in Example 11. A stable emulsion was obtained. The product was applied to wool, silk, nylon, viscose process rayon and cellulose acetate rayon as in Example 2. A full crisp hand was obtained on the fabrics.

Example 14

20 parts of ester gum and 0.4 part of benzoyl peroxide were dissolved in 20 parts of n-butyl methacrylate monomer. The solution was emulsified by mixing with 2 parts of stearyl trimethyl ammonium bromide dissolved in 57.6 parts of water using a high speed stirrer. The emulsion was homogenized, then heated in a closed container to 65° C. and the temperature held for 16 hours. A stable dispersion of a resin was obtained. The product was substantive to wool, silk, nylon, viscose process rayon and cellulose acetate rayon when applied as in Example 2. A full, crisp hand was obtained on the fabrics. The product improved the slip resistance of the rayon fabrics and the snag resistance of the silk and nylon stockings.

Example 15

5 parts of a 32% basic aluminum acetate solution and 0.7 part of acetic acid were added to 94.5 parts of the product from Example 14. A stable dispersion was obtained. The product was highly substantive to wool, silk, nylon, viscose process rayon, and cellulose acetate rayon when applied as in Example 2. The finishes obtained were similar to those in Example 14.

Example 16

13 parts of coumarone-indene resin and 0.2 part of benzoyl peroxide were dissolved in 27 parts of methyl methacrylate monomer. The solution was emulsified by mixing with 2.4 parts of stearyl trimethyl ammonium bromide dissolved in 57.4 parts of water using a high speed stirrer. The emulsion was homogenized, then heated in a closed container to 65° C. and the temperature held there for 16 hours. A stable dispersion of a resin was obtained. The product was highly substantive to wool, silk, nylon, viscose process rayon and cellulose acetate rayon when applied as in Example 2.

Example 17

13 parts of a modified phenol aldehyde resin were substituted for the coumarone-indene resin in Example 16. A stable dispersion of a resin was obtained. The product was highly substantive to wool, silk, nylon, viscose process rayon and cellulose acetate rayon when applied as in Example 2.

Example 18

13 parts of a rosin modified alkyd resin were substituted for the coumarone-indene resin in Example 16. A stable dispersion of a resin was obtained. The resin was highly substantive to wool, silk, nylon, viscose process rayon and cellulose acetate rayon when applied as in Example 2.

Example 19

14.5 parts of hydrogenated ester gum and 0.2 part of benzoyl peroxide were dissolved in 27 parts of vinyl acetate monomer. The solution was emulsified by mixing with 1.2 parts of stearyl trimethyl ammonium bromide dissolved in 57.1 parts of water using a high speed mixer. The emulsion was homogenized, then heated in a closed container to 65° C., and the temperature held there for 16 hours. A stable dispersion of a resin was obtained. The product was highly substantive to wool, silk, nylon, viscose process rayon and cellulose acetate rayon when applied as in Example 2. A full crisp hand was obtained on the fabrics. The product improved the slip resistance of the rayon fabrics and the snag resistance of the silk and nylon stockings.

Example 20

The stearyl trimethyl ammonium bromide in Example 19 was replaced by the condensation product of diethanolamine and stearic acid reacted with dimethyl sulfate (U. S. Patent 2,096,749). A similar product was obtained.

Example 21

14.5 parts of a coumarone-indene resin was substituted for the hydrogenated ester gum in Example 19. A stable dispersion of a resin was obtained. The product was highly substantive to wool, silk, nylon, viscose process rayon and cellulose acetate rayon when applied as in Example 2.

Example 22

The stearyl trimethyl ammonium bromide in Example 21 was replaced by the condensation product of diethanolamine and stearic acid reacted with dimethyl sulfate (U. S. Patent 2,096,-749). A similar product was obtained.

Example 23

14.5 parts of a modified phenol formaldehyde resin and 0.2 part of benzoyl peroxide were dissolved in 27 parts of vinyl acetate monomer. The solution was emulsified by mixing with 2 parts of stearyl trimethyl-ammonium bromide and 56.3 parts of water and the emulsion aged as in Example 19. A stable dispersion was obtained. The product was highly substantive to wool, silk, nylon, viscose process rayon and cellulose acetate rayon when applied as in Example 2.

Example 24

The stearyl trimethyl ammonium bromide in Example 23 was replaced by the condensation product of diethanolamine and stearic acid reacted with dimethyl sulfate (U. S. Patent 2,096,749). A similar product was obtained.

Example 25

(a) 2.5 parts of bleached sulfite pulp was placed in a beater in 90 parts of soft water and the bath was adjusted to a pH of 5.5. 0.025 part of the product of Example 19 was dispersed in 7.475 parts of water and added to the beater. The pulp, water and resinous dispersion were agitated 20 minutes at 70° F. The resulting mass was removed from the beater, filtered and the amount of dispersion not retained by the paper was determined by a turbidity method. More than 90% of the dispersion was exhausted from the bath. The wet strength of the paper was markedly increased.

(b) The pH of the pulp (as in Example 19a) in water was adjusted to 7.0 and the run repeated. Similar results were obtained.

(c) The pH of the pulp (as in Example 19a) in water was adjusted to 8.0 and the run repeated. Similar results were obtained.

Example 26

Ten parts of ester gum, 3 parts of di(methyl cyclohexyl) adipate and 0.2 part of benzoyl peroxide were dissolved in 20 parts of methyl methacrylate monomer. The solution was emulsified by mixing with 2 parts of stearyl trimethyl ammonium bromide dissolved in 64.8 parts of water using a high-speed stirrer. The emulsion was homogenized, then heated in a closed container at 67° C., and the temperature held there for 16 hours. A stable dispersion of a resin was obtained. The product was substantive to wool, silk, nylon, viscose process rayon and cellulose acetate rayon when applied as in Example 2. A full hand was obtained on the fabrics. The product improved the slip resistance of the rayon fabrics and the snag resistance of the silk and nylon stockings.

The methods used in preparing substantive dispersions of methacrylate ester polymers and vinyl alcohol ester polymers in this case are applicable to water insoluble polymerizable hydrocarbons and particularly to vinyl compounds. Other vinyl derivatives that may be used include the monomers of vinyl chloride, vinyl esters, styrene, acrylamides, methacrylamides, acrylonitriles and methacrylonitriles. All of these are conjugated compounds. The resin phase may be prepared using one or more of these liquid polymerizable materials. The resin phase may be modified by incorporating resins, plasticizers, and materials which have an effect on the film forming properties. The resins used are soluble in the monomeric liquid and are selected from alkyd and modified alkyd resins, coumarone-indene resins, phenol-aldehyde and modified phenol-aldehyde resins, natural resins and gums and their esters. Examples of suitable plasticizers are given by Strain, Kennelly and Dittmar, Ind. Eng. Chem. 31, 382 (1939).

Suitable cationic surface active agents are long-chain alkyl pyridinium salts; long chain quaternary ammonium, quaternary phosphonium and ternary sulfonium salts; amides prepared by reacting acids or acid derivatives with polyamines followed by alkylation, e. g., the product prepared by treating the amide of oleic acid and ethylene diamine with dimethyl sulfate; products of the type of diethanolamine condensed with stearic acid and aftertreated with dimethyl sulfate (U. S. Patent 2,096,749); and products prepared by the reaction of an alkylamine and an alpha substituted halogenated fatty acid (U. S. Patent 2,129,264).

The rate of polymerization of vinyl derivatives varies widely; the temperature required may vary from room temperature to 95° C. In working with acrylates, methacrylates, and vinyl acetate it is preferable to polymerize at 50° C. to 75° C.

The heavy metal and multivalent metal water soluble salts, if used, may be added either during emulsification or after polymerization is complete.

Compositions described in this invention are useful as sizes for general use on textiles and paper. The compositions produce slip resistance finishes on textiles and increase the wet strength of paper. The finishes are valuable for producing snag resistant and slip resistant effects on nylon and silk piece goods, knitted goods and hosiery. They may be used to produce durable wash-resistant starch-like finishes on textiles. The finishes may be used in sizing textiles alone or as binders for fillers as starch, dextrin, gums, talc, clay, etc.

A primary advantage of the compositions covered in this invention is their application to textiles of all types including animal fibers, nylon, and cellulosic materials, and to paper by a process of exhaustion from a dilute bath. The compositions are particularly adapted to the economical treatment of knitted fabrics which cannot be handled satisfactorily by a padding operation. They can be applied to fabrics containing mixed fibers and particularly to fabrics containing mixtures of wool and rayon staple in plants, such as woolen mills, which ordinarily are not equipped to handle goods on a quetsch.

The compositions are particularly valuable for application to silk hosiery and to nylon hosiery to produce durable, wash-fast finishes that improve the resistance of the sheer fabric to snagging.

The compositions are compatible with cationic surface active agents, with heavy metal salts, and with other positively charged dispersions as for example wax dispersions adapted to produce water-repellent effects on textiles. Combinations of these compositions and materials may be applied to obtain widely varying finishing effects.

The above description and examples are intended to be illustrative only and not to limit the scope of the invention. Any departure therefrom which conforms to the spirit of the invention is intended to be included within the scope of the appended claims.

I claim:

1. A process of finishing textile fibers by exhausting thereon a highly dispersed polymerized vinyl compound from a dilute aqueous suspension of the same having a pH of from 4.0 to 7.5, the vinyl compound having been rendered substantive to the fiber by being dispersed in aqueous medium with a cationic surface active agent prior to dilution in the treating bath.

2. A process of finishing textile fibers by exhausting thereon a highly dispersed polymerized vinyl compound from a dilute aqueous suspension of the same having a pH of from 4.0 to 7.5, which vinyl compound has been rendered substantive to the fiber by polymerizing an aqueous emulsion of the monomer in the presence of a cationic surface active agent.

3. A process of finishing textile fibers by exhausting thereon a highly dispersed polymerized alkyl alkycrylate from a dilute aqueous suspension of the same having a pH of from 4.0 to 7.5, the alkyl alkacrylate having been rendered substantive to the fiber by being dispersed in aqueous medium with a cationic surface active agent prior to dilution in the treating bath.

4. A process of finishing textile fibers by exhausting thereon a highly dispersed polymerized methyl methacrylate from a dilute aqueous suspension of the same having a pH of from 4.0 to 7.5, the methyl methacrylate having been rendered substantive to the fiber by being dispersed in aqueous medium with a cationic surface active agent prior to dilution in the treating bath.

5. A process of finishing textile fibers by exhausting thereon a highly dispersed polymerized methyl methacrylate from a dilute aqueous suspension of the same having a pH of from 4.0 to 7.5, which compound has been rendered substantive to the fiber by polymerizing an aqueous emulsion of the monomer in the presence of a cationic surface active agent.

6. A process of finishing textile fibers by exhausting thereon from a dilute aqueous suspension having a pH of from 4.0 to 7.5, a highly dispersed polymerized alkyl methacrylate containing intimately incorporated in said polymer an ester gum, the mixed resins having been rendered substantive to the fiber by being dispersed in an aqueous medium with a cationic surface active agent prior to dilution in the treating bath.

JOSEPH EDWARD SMITH.